United States Patent
Navert et al.

(10) Patent No.: US 11,429,384 B1
(45) Date of Patent: Aug. 30, 2022

(54) SYSTEM AND METHOD FOR COMPUTER DEVELOPMENT DATA AGGREGATION

(71) Applicant: Morgan Stanley Services Group Inc., New York, NY (US)

(72) Inventors: Bruno Navert, Longueuil (CA); Patrick Ayoup, Montreal (CA)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 17/501,578

(22) Filed: Oct. 14, 2021

(51) Int. Cl.
*G06F 8/77* (2018.01)

(52) U.S. Cl.
CPC ..................... *G06F 8/77* (2013.01)

(58) Field of Classification Search
None
See application file for complete search history.

(56) References Cited

U.S. PATENT DOCUMENTS

| | | | |
|---|---|---|---|
| 9,135,146 B1 * | 9/2015 | Allen | G06F 11/0706 |
| 10,776,719 B2 * | 9/2020 | Maheshwari | G06N 20/00 |
| 2011/0219360 A1 * | 9/2011 | Srinivasa | G06F 9/44 717/124 |
| 2018/0068271 A1 | 3/2018 | Abebe et al. | |
| 2018/0082233 A1 * | 3/2018 | Apshankar | G06F 11/328 |
| 2018/0196731 A1 | 7/2018 | Moorthi et al. | |
| 2019/0026106 A1 * | 1/2019 | Burton | G06N 20/00 |
| 2019/0129704 A1 * | 5/2019 | Beard | G06F 16/3344 |
| 2020/0097388 A1 | 3/2020 | Bhat et al. | |
| 2020/0125530 A1 | 4/2020 | Barth et al. | |
| 2020/0159525 A1 | 5/2020 | Bhalla et al. | |
| 2020/0218993 A1 | 7/2020 | Kumar | |
| 2020/0265145 A1 * | 8/2020 | Slabyak | G06F 30/20 |
| 2020/0310769 A1 | 10/2020 | Veljanoski et al. | |
| 2021/0064364 A1 * | 3/2021 | Culibrk | G06F 8/71 |

OTHER PUBLICATIONS

S. Zhang, Y. Wang and J. Xiao, "Mining Individual Performance Indicators in Collaborative Development Using Software Repositories," 2008 15th Asia-Pacific Software Engineering Conference, 2008, pp. 247-254, doi: 10.1109/APSEC.2008.12. (Year: 2008).*

* cited by examiner

*Primary Examiner* — Andrew M. Lyons
(74) *Attorney, Agent, or Firm* — Pearl Cohen Zedek Latzer Baratz LLP

(57) ABSTRACT

A system and method may integrate project development information. e.g. software development lifecycle (SDLC), information, collecting sets of SDLC data, each set in a format different from the format of others of the sets of SDLC data. An analysis of the sets of SDLC data may be produced from the sets of SDLC data, and displayed in a SDLC or planning system. The sets of planning data may be collected from a number of project management or SDLC systems. The analysis may be a KPI (key performance indicator), best practice recommendation, or other analysis.

14 Claims, 14 Drawing Sheets

Pull Request Workflow

This badge evaluates whether or not your project is following the pull request workflow with code reviews and pre-merge builds/tests Want to optout from this badge?

Badge Requirements                                                    Troubleshooting ☆ Adopting

| ✓ Step 1: Project has a Git Repository | |
| --- | --- |
| ✓ Step 2: Project uses Pull Requests | |
| ✓ Step 3: Git is primary SCM in Train Portal | |
| ✓ Step 4: Pull Requests require all tasks to be completed before merging | |
| ✓ Step 5: Pull Requests have evidence of review | 10% |
| ✓ Step 6: Project uses the Fork/Pull workflow | |
| ✓ Step 7: Commits originate from Pull Requests | 40% |
| ✓ Step 8: Pull Requests are approved before merging | 80% |

♛ Performing

| ✓ Step 1: Pull Requests require at least one successful build before merging | |
| --- | --- |
| ✓ Step 2: Pull Requests require at least one approval before merging | |
| ✓ Step 3: Direct commits restricted; PRs required | |
| ✓ Step 4: Pull Requests have further evidence of review | 40% |
| ✓ Step 5: Project has a Private CI job configured in Train | |
| ✓ Step 6: Commits are linked to Jira stories | 70% |
| ✓ Step 7: Pull Requests are automatically unapproved on new changes | |
| ✓ Step 8: Jira required on every commit | |
| ✓ Step 9: Pull Request approved by IT Code Reviewer | |
| ✓ Step 10: Pull Requests have successful build before merging | 70% |

FIG. 5

Aggregate System KPIs

1. First choose an Aggregation Level for the analysis.
2. Then select KPIs you want to analyze.
3. Finally use the filters below them to select relevant entities.

1. Aggregation Level ⓘ
[f) System ▼]

3. Super Division ▼  Division
[(All) ▼] [(All) ▼]
Department  Primary ITSO Region
[(All) ▼] [(All) ▼]

DART | Data, Analytics Reporting and Tools
Last Data Refresh: 6/13/2021 7:02:47 PM ⓘ

● All systems
○ Systems included in aggregates

2. KPI Category  KPI
[(All) ▼] [(Multiple values) ▼]

Super Department
[(All) ▼]
System
[(All) ▼]

Month: [Apr 2021 ▼]   Baseline: [Trailing 12M Average ▼]

KPI & Trend Values

| | Change Fail Rate ⓘ | | Delivery Lead Time ⓘ | | Delivery Preparation Time ⓘ | | Delivery Wait Time ⓘ | | Deployment Frequency ⓘ | |
|---|---|---|---|---|---|---|---|---|---|---|
| | Average | Trend | Average | Trend | Average | Trend | Average | Trend | Average | Trend |
| 3C | 0.0 | ⇘ -100.0% | 23.9 | ⇘ -8.0% | 12.7 | ⇘ 57.7% | 11.0 | ⇘ -36.8% | 3.0 | ⇘ 300.1% |
| 3D Financial | 0.0 | ⇘ -100.0% | 29.6 | ⇗ 41.8% | 9.9 | ⇘ -32.6% | 27.0 | ⇗ 392.7% | 5.3 | ⇘ 9.1% |
| 3D Framework | 0.0 | ⇘ -100.0% | 14.8 | ⇘ -79.9% | 9.0 | ⇘ -86.7% | 5.0 | ⇘ -35.5% | 8.0 | ⇘ 10.8% |
| 3D Mobile iOS Nativ. | 0.0 | ⇧ | | | | | | | 1.7 | ⇘ 11.1% |
| 3Rs | | | 44.5 | ⇧ | 39.5 | ⇧ | 5.0 | ⇧ | 0.3 | ⇧ |
| 3RsPlus | 0.0 | ⇧ | 5.5 | ⇧ | 4.7 | ⇧ | 0.8 | ⇧ | 0.5 | ⇧ |
| /ms/ied/Derivstrat.. | 5.5 | ⇧ | | | | | | | 55.0 | ⇧ |
| A2 Apps | 0.0 | ⇘ -100.0% | 21.7 | ⇘ -23.2% | 19.7 | ⇘ -24.6% | 2.0 | ⇘ -33.0% | 12.7 | ⇘ 2.7% |
| A2 DB Plant | | | | | | | | | 1.0 | ⇘ 9.1% |

FIG. 8

SYSTEM AND METHOD FOR COMPUTER DEVELOPMENT DATA AGGREGATION

FIELD OF THE INVENTION

The present invention relates generally to project development data, and technologies to combine, analyze and display such data.

BACKGROUND OF THE INVENTION

Computer systems and technologies exist to control the development of computer software, including software or project development tools such as Software Development Life Cycle (SDLC) and information technology service management (ITSM) tools. Typically, different tools handle different aspects of project development. These different tools operate on different data or information sets, and current technology cannot create aggregated, general data from the disparate data sets controlled by disparate proprietary and third-party platforms. Current technology may compute key performance indicators (KPI) or other measurable values of performance, but cannot do so based on the data from these different systems. Current technology may display software development status, but development status based on data from different sources cannot be displayed. Integrating these different data sets, each describing different phenomena or different aspects of the same phenomenon, is not performed by current technology.

SUMMARY OF THE INVENTION

A system and method may integrate project development information, e.g. software development lifecycle (SDLC), information, collecting sets of SDLC data, each set in a format different from the format of others of the sets of SDLC data. An analysis of the sets of SDLC data may be produced from the sets of SDLC data, and displayed in a SDLC or planning system. The sets of planning data may be collected from a number of project management or SDLC systems. The analysis may be a KPI (key performance indicator), best practice recommendation, or other analysis.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

FIG. 5 depicts a display presented to a user after clicking on an example badge according to an embodiment of the present invention.

Figure 1:
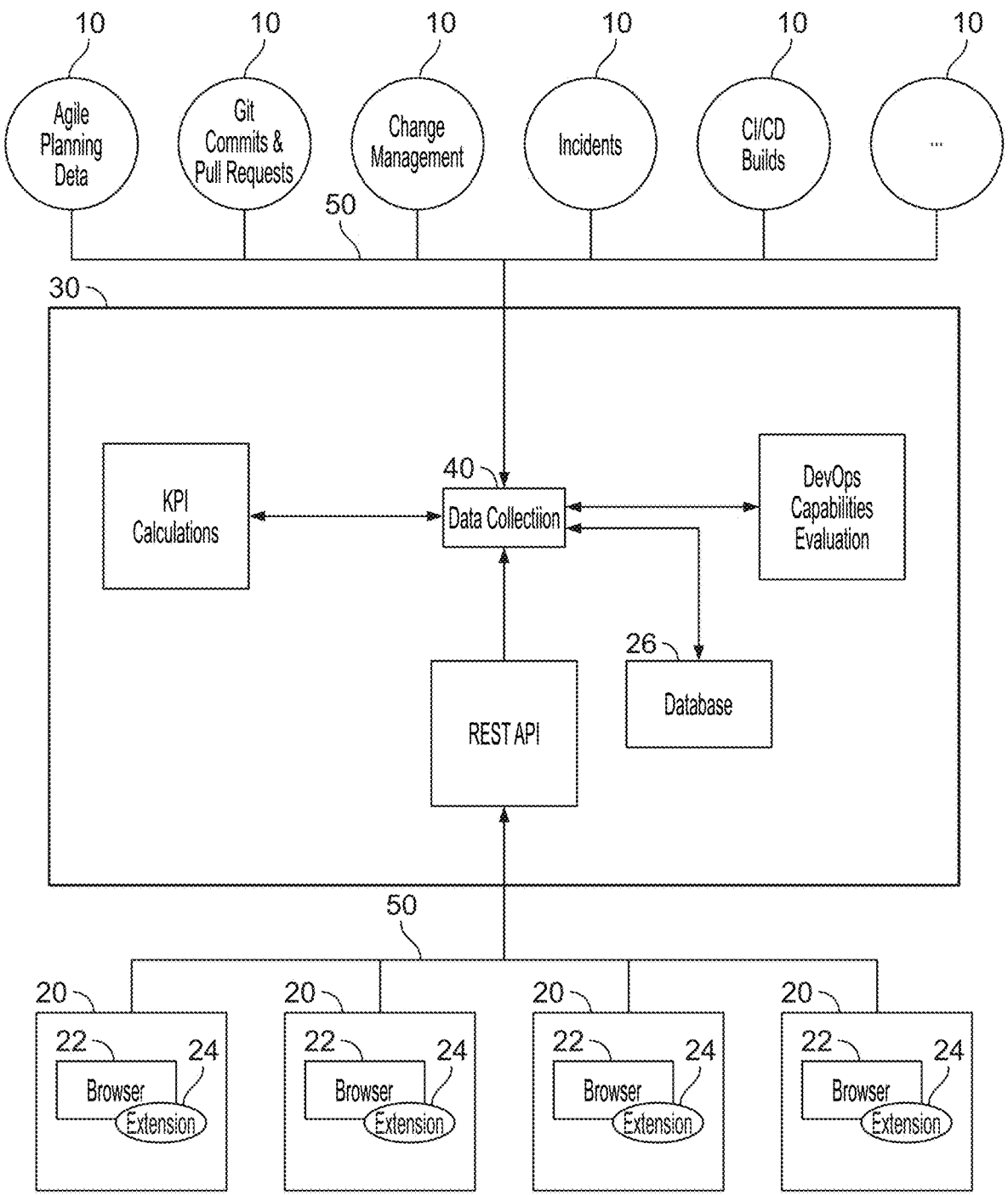
FIG. 1 depicts a computer development data aggregation system according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments may gather information or data from a full range of software or project development tools such as Complete Software Development Life Cycle (SDLC) and Information technology service management (ITSM) tools, from development to production, including data from proprietary and third-party platforms. Embodiments may use the data to compute KPIs or other measurable values of performance, metrics and best practice recommendations. Embodiments may join together and make sense of a full range of SDLC data sets, from development practices, to deployments and every step in the SDLC workflow, in such a way as to measure KPIs, and aggregate data at various levels of an organization, providing high level views of KPIs for entire organizations.

The computed data or analysis results may be injected directly into (e.g. displayed on) development systems, planning systems or tools, development repositories views, agile software development boards, dashboards and other sites, as well as aggregated into view points from various levels of granularity aligned with organizational structure. Agile is a set of practices intended to improve the effectiveness of software development teams, and agile data may be presented to users on boards or other systems. Embodiments may provide direct injection of metrics and best practice recommendations in third-party development and agile planning tools, transparently and without requiring modifications to those tools. Embodiments may bring functionality to tools that developers use on a day-to-day basis, encouraging adoption of best practices without requiring that developers navigate to an external site. Additions to existing applications or tools may be created using for example browser extensions, small software modules for customizing a web browser on which is executing the relevant tool or application. For example, a Google Chrome Extension may be installed automatically on the desktop or computer of developers and may be activated when the developer navigates in the browser to, for example Atlassian Bitbucket code management software, an Atlassian software Kanban board, or Jira pages, such that metrics calculated may be displayed on these or other tools.

Functionality may be added to a preexisting SLDC or project management function or application by adding to the browser which executes that existing application a browser extension or browser plug-in which displays a badge or link to a user on the browser executing the preexisting application, such that when the user selects or clicks on the displayed representation of the extension, functionality displays calculated data (e.g. a KPI or recommendation). A browser extension, e.g. extension 24 in FIG. 1, may be a software module customizing or adding functionality to a web browser. A process may receive, from a user, a request to display the analysis, KPI, or recommendation. e.g. via a user clicking on display badge executed by an extension added to a preexisting software development system (e.g. the extension may receive user input asking that analysis be displayed, in response to which the analysis may be displayed). Preexisting may mean an existing software application to which an extension is added.

Data such as SDLC or project development information or data may come from a variety of data sources or project development systems which software developers interact with on a daily basis, such as agile planning data, data from source code revision or version control tools such as Git software (software for tracking changes in a set of software files) such as Git commits or other commits, change management (e.g. the ServiceNow or Remedy systems, or other systems), incidents (e.g. problems in production code), builds, etc. Each set of or SDLC project development data may be in a format different from the format of other of the SDLC or project development systems and/or include different sets of information: e.g. Git project development data may differ from agile project development data. A build may be the process of building or converting source code files into standalone software artifacts that can be executed on a computer: (e.g. an overall software development workflow to develop software or code). Artefacts that result from a build may be termed the code, executable, binary code, or release resulting from a the process that is the build. A build may contain changes which implement issues, and those issues may belong to a sprint (e.g., timeboxed duration of time a team focuses on a limited scope of tasks).

FIG. 1 depicts a computer development data aggregation system according to embodiments of the present invention. Some of the components of FIG. 1 may be separate computing devices such as servers and others may be combined into one computing device. Some modules in FIG. 1 may be included in other computing devices than as shown. Referring to FIG. 1, various preexisting applications 10 may collect, create, and display to users (e.g. via user terminals 20) project development data. Developers may enter developer data, e.g. jira or agile data, and create and manipulate code and other project related data, using terminals 20. Applications 10 may be SLDC or other applications such as an Atlassian tool, may be executed e.g. by one or more servers 30 (e.g. such as a computer depicted in FIG. 7), and may include an Agile tool, a Git tool, a change management tool, an incident tool, a build tool, and/or other tools or applications. Each of user terminals 20 may be remote from one or more servers 30 hosting applications 10, and terminals 20 and servers 30 may be connected by a network 50 (e.g. the internet). User terminals 20 may execute a browser 22 (e.g. Google Chrome, or another browser) which hosts or executes one or more applications 10, e.g. executing on a server 30. An extension or plug-in 24 may be installed in a browser, providing functionality to or modifying the experience provided by the application executing on the browser, as described herein. Extension or plug-in 24 may be displayed on an application 10 executed by browser 24 (and thus it may be considered that either or both of browser 22 and application 10 may be modified by and interact with plug-in 24). For example, a user may select a plug-in 24 to display created data. A data collection function 40 may collect SLDC or project development data from applications 10, store such data in database 26, calculate metrics, KPIs or best practices as described herein, and display the data via extensions 24 in browsers 22. Data collection function 40 may be executed on a server 30 or another system, and may communicate with users, browsers, and user terminals via network 50.

Embodiments may take or receive data such as software development from Jira, an issue tracking software by Atlassian which is used by teams to track the work they have planned, in progress, and completed. Other work or issue tracking software may be used. Jira allows agile planning, to plan and track the work in team sprints. A sprint may be a short time frame, e.g. one to four weeks, associated with tasks; e.g. a sprint may define a development period. Complexity of tasks such as issues or other tasks may be measured by for example story points (a relative unit of complexity), stored in Jira; other measures may be used. Such data is used to calculate a variety of metrics, e.g. velocity. Velocity may measure the capacity of a team in terms of how many tasks of given complexity the team can complete or have completed, and may be the number of story points completed per sprint. Velocity may measure past performance using, e.g. story points; capacity may measure the capability of a team in, for example, story points. Story points may measure the complexity of a task and be assigned to a project at the start of the project by, for example, the people designing the project. Methods or units to measure the complexity of tasks or the amount of tasks completed other than velocity and story points may be used. A measure of completed or capacity for tasks other than velocity may be used. A Jira issue may be a task to be completed on a project such as a software project. For example, an issue, or a Jira issue, may be any task or piece of a project, such as a story, a subtask of a story, a bug or problem, etc. A story may be a larger project, such as creating a new screen or functionality area in a software package, and may include multiple issues and sprints. Metrics or measures such as velocity may be created and presented to users by embodiments of the present invention as KPIs.

The example JSON snippet in Table 1 shows an example simplified sample representation of a Jira issue:

TABLE 1

```
"key": "EXAMPLE-1",
"fields": {
"created": "2020-01-10T16:01:42Z",
        "updated":      "2021-01-05T13:32:11Z",
    "storypoints": 10,
      "agilesquad": "The Squad",
      "sprint": "The Squad Sprint 2"
    },
    "changelog": {
      "startAt": 0,
      "maxResults": 4,     "total": 2,
      "histories": [
{
      "field": "status",
      "fieldtype": "jira",
      "from": "10193",
      "fromString": "To Do",
      "to": "11689",
      "toString": "Ready For Development"
    }
  ]
},
{
"created": "2020-03-04T17:19:06.910-0500", "items": [
{
      "field": "status",
      "fieldtype": "jira",
      "from": "11689",
      "fromString" : "Ready For Development" , "to: 1292" ,
      "toString": "In Development"
      }
  ]
 }
 ]
}
}
```

In the example in Table 1, one can see that an issue was created on the date 2020-01-10 associated with or having an estimate of 10 story points; that this issue is attributed to the development period "The Squad Sprint 2"; and that a custom field called "agilesquad" to attributes the Jira issue to a specific team of developers, named here The Squad. The changelog section in Table 1 may be used to track changes to a Jira issue. This may help to identify when a Jira issue changes states (e.g. the status of a workflow, such as open, in-progress or resolved-closed) through its workflow. "Issues" or project descriptions other than shown in Table 1 may be used.

Embodiments may, in addition to Jira issues themselves, analyze the metadata for the sprints these issues are assigned to. Table 2 shows an example simplified representation of a JSON snippet representing an example sprint.

TABLE 2

```
{
  "maxResults": 2
"startAt": 1
  "total": 5,
  "isLast": false,
  "values": [
{
  "id": 37,
       "self":
"http://www.jira.com/jira/rest/agile/1.0/sprint/23",
         "state": "closed",
         "name": "The Squad Sprint 2",
         "start-Date": "2020-03-01T15:22:00.000+10:00",
         "endDate": "2015-03-14T01:22:00.000+10:00",
        "completeDate": "2015-03-14T11:04:00.000+10:00",
         "originBoardId": 5
  },
{
     "id": 72,
        "self":
"http://www.example.com/jira/rest/agile/1.0/sprint/73",
     "state": "future",
         "name": The Squad Sprint 3"
  }
  ]
}
```

Figure 2:
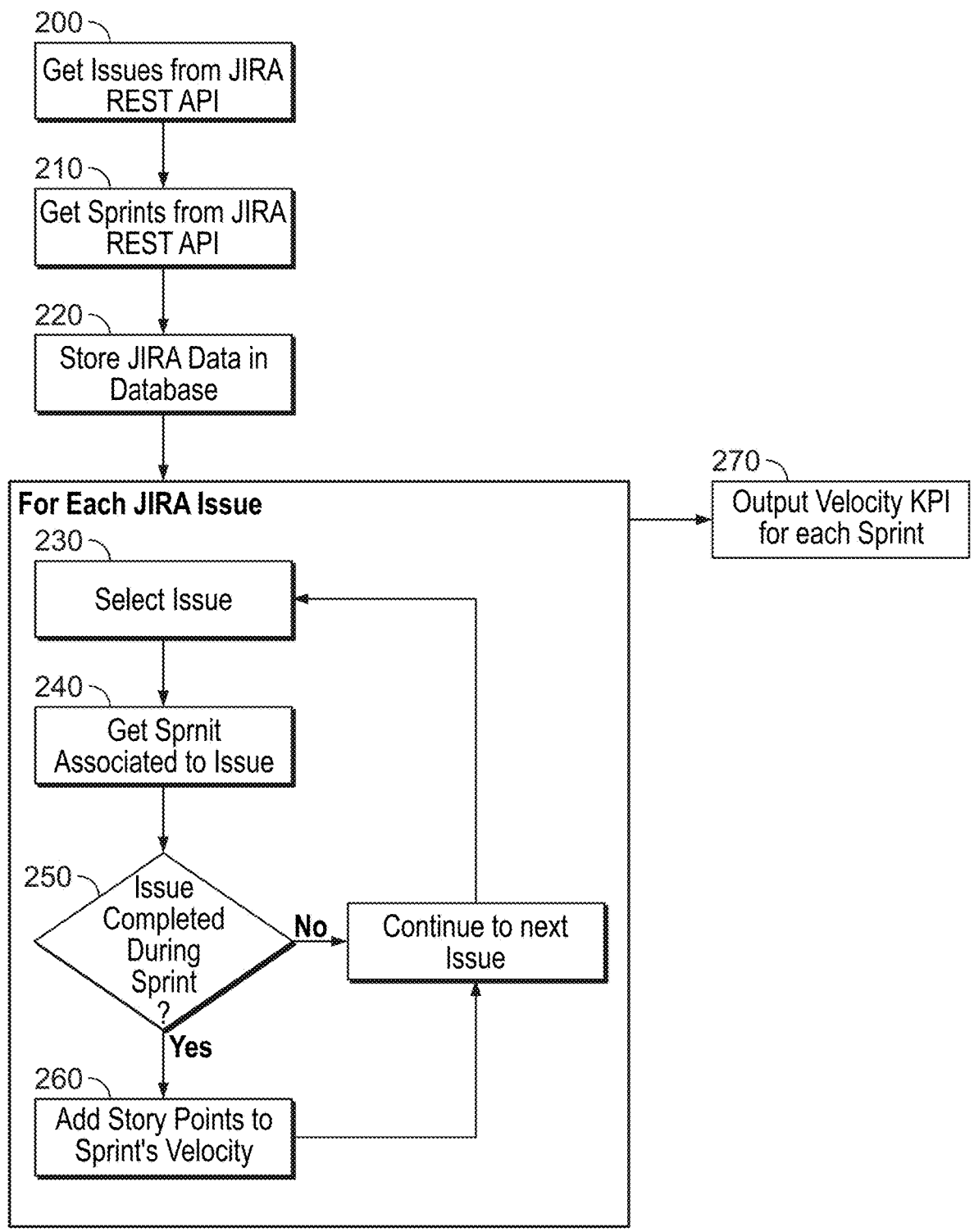
FIG. 2 depicts a series of operations according to an embodiment of the present invention.

Using the example metadata in Table 2, an embodiment may find the boundaries of a sprint, e.g. when the sprint begins and when it is completed, or the time period of the print. In one embodiment, boundaries are found or denoted by user input received by a process described herein: e.g. a user "clicks" or enters into a GUI when a sprint is started, and enters or clicks "complete" when the sprint is completed. Embodiments may use this information is for computing sprint velocity. Among the KPIs or ratings which may be calculated by embodiments of the invention is sprint velocity Using the example of velocity as a KPI which an embodiment can derive from data in, for example. Jira or other work or issue tracking software, an example data flow process from the source to the computation of the velocity is shown in FIG. 2, showing a series of operations according to an embodiment of the present invention. FIG. 2 depicts an example method of collecting sets of SDLC or project development data (e.g. sprint data and issue data), each set in a format different from the format of other of the sets of SDLC or project development data (e.g. the format of Table 1 vs. that of Table 2); and producing from these sets of data, an analysis of the data, e.g. velocity. The resulting analysis may be displayed in a SDLC, project planning or project development system: e.g. a badge or tab may be added to a preexisting project management tool, which if clicked on displays velocity data. The system(s) from which data is collected, e.g. SDLC, may be different from a system in which data is displayed (e.g. data may be displayed in a Jira planning system in a case where Jira data is not used as input).

Referring to FIG. 2, in operation 200, project management data such as issues may be retrieved from work or issue tracking software such as Jira. Communication with software such as Jira may be via a REST API (an application program interface; also known as a RESTful API) provided by Bitbucket, a Git hosting software by Atlassian; other APIs or methods may be used.

In operation 210, project management data such as sprints or other descriptions of development periods may be retrieved from work or issue tracking software such as Jira, e.g. via a REST API or other methods. The format of the sprint data may be different from that of the issue data.

In operation 220 the retrieved data may be stored in a database, e.g. database 26 in FIG. 1.

In operations 230-270, analysis of the different sets of data may be created: for example, for each issue or task (e.g. a Jira issue), velocity may be calculated. In operation 230, an issue may be selected. In operation 240, the sprint associated with the selected issue may be retrieved. This may be done through for example a REST API or other application program interface. Data retrieved describing an issue from a REST or other API may include an attribute which details the sprint the issue belongs to, and that sprint may be identified and retrieved. In operation 250, it may be determined if the issue was completed during the sprint. An automatic process may determine that an issue (or other task) is completed by for example comparing the timestamps associated with the completion of that issue to the start and end times for the sprint associated with the issue. An issue creation timestamp may be automatically generated when the user creates an issue, and may be automatically generated when the user transitions an issue into its final state (e.g., state is done). If the issue completion is within the time range for the start and end times for the sprint, the issue was completed during the sprint. If not, the issue was not completed during the sprint. Other methods of determining if the issue was completed during the sprint may be used. In operation 260, if the issue was completed during the sprint, the story points (or other measure of effort or work) associated with the issue may be added to (e.g. summed with) that sprint's velocity; if the issue was not completed, the next issue may be analyzed in operation 230; if there are no more issues to select, the process may proceed to operation 270. In operation 270, the analysis (e.g. velocity for sprints) may be output or provided to another process, or displayed in a SDLC, project planning or project development system. The analysis may be a KPI: e.g. velocity may be considered to be a KPI.

An example of operations of FIG. 2 is shown with respect to Table 3, describing sprints, and Table 4, describing story points. Such data, as with other data described herein, may be entered by users via terminals 20 and/or created automatically by processed described herein.

TABLE 3

| Sprint Name | Sprint Start | Sprint Complete |
| --- | --- | --- |
| Squad A Sprint 1 | 2021 Jan. 1 | 2021 Jan. 14 |
| Squad A Sprint 2 | 2021 Jan. 15 | 2021 Jan. 29 |
| Squad A Sprint 3 | 2021 Jan. 1 | 2021 Jan. 14 |

TABLE 4

| Jira ID | Story Points | Sprint Name | Closed Date |
| --- | --- | --- | --- |
| MY-PROJECT-1 | 5 | Squad A Sprint 1 | 2021 Jan. 2 |
| MYPROJECT-2 | 5 | Squad A Sprint 1 | 2021 Jan. 3 |
| MYPROJECT-3 | 10 | Squad A Sprint 2 | 2021 Jan. 16 |
| MYPROJECT-4 | 5 | Squad A Sprint 2 | 2021 Jan. 7 |
| MYPROJECT-5 | 5 | Squad A Sprint 2 | 2021 Apr. 15 |
| MYPROJECT-6 | 1 | Squad B Sprint 1 | 2021 Jan. 4 |
| MYPROJECT-7 | 4 | Squad B Sprint 1 | 2021 Jan. 5 |

Referring to Tables 3 and 4, for Squad A Sprint 1, both issues were completed within the bounds of the sprint, therefore the sum and velocity is 10 story points (5+5). For Squad A Sprint 2, the first two issues were completed within the bounds of the sprint, but the third was not. Therefore, the sum, and the velocity, are 15 story points (10+5). For Squad B Sprint 1: both issues were completed within the bounds of the sprint, therefore the sum, and the velocity, are 5 story points (1+4).

Embodiments may produce KPIs or other ratings and display them to users. A KPI such as velocity may give insight into how much complexity a team can handle during a given sprint. Embodiments that compute the velocity of past sprints for a team may allow developers to review their past performance to make informed decisions about how much work to take on in future sprints. In prior art systems, one would have to refer to reports and dashboards to find this information, but some embodiments take this computed velocity and inject it directly into the tools where developers perform planning.

Figure 3:
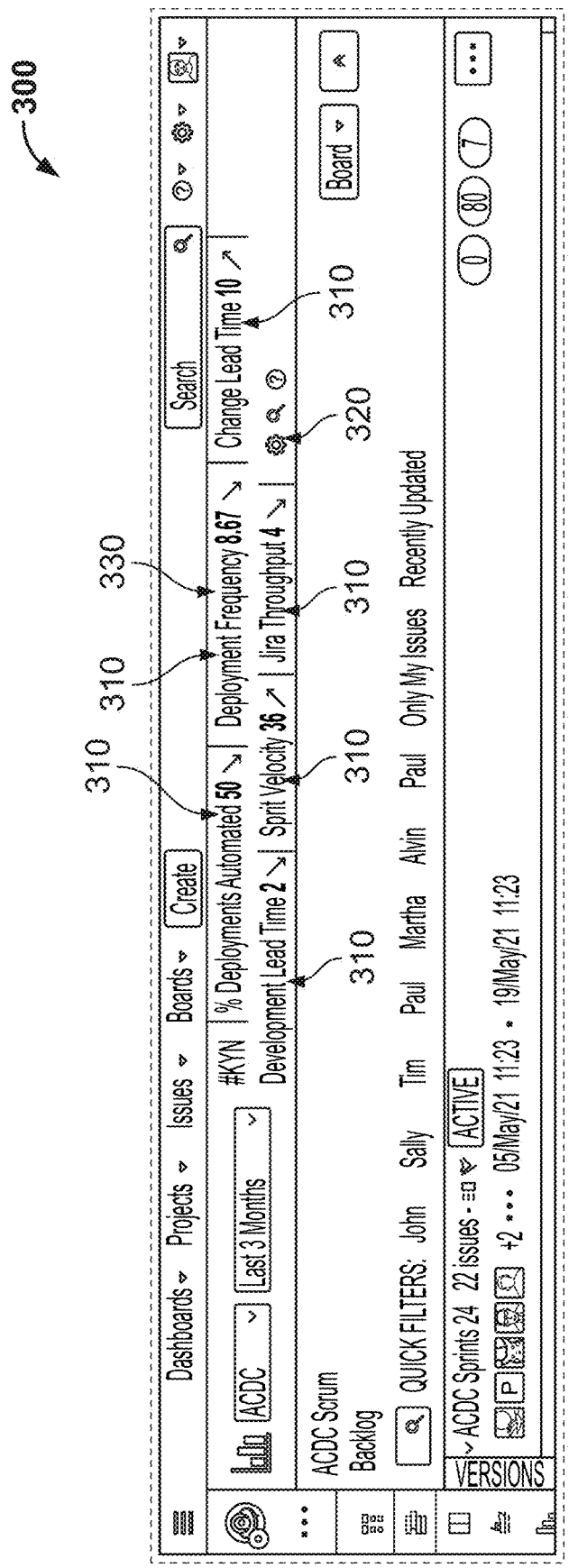
FIG. 3 is an example display of a backlog view in an example Jira application with additional capabilities, according to embodiments of the present invention.

Prior art project management software applications such as agile Boards in Atlassian's Jira tool may not support the functionality of displaying metrics such as agile KPIs; however, since such tools may be used by agile or other teams daily for planning, embodiments may modify the agile or other user interfaces to inject KPIs calculated as discussed herein directly FIG. 3 shows a backlog view in an example Jira application 300 (e.g. the displayed version of an application 20), allowing a team to perform sprint planning, with additional capabilities, according to embodiments of the present invention. The display of FIG. 3 and other displays shown herein may be displayed on e.g. a monitor such as on terminal 20 in FIG. 1. Buttons 310 may be the displayed aspect of plug-ins 24. In prior art systems, a user would need to navigate away from tools such as Jira in order to view this data. Embodiments of the invention compute these metrics make them readily available, presenting these metrics to the user in a location where it is most useful without needing to navigate away. In some embodiments, a user may provide input to a process, e.g. by clicking on gear icon 320, and be provided with a selection of ratings, KPIs, metrics, best practices, buttons, links, etc. which are then displayed if selected: e.g. buttons 310 in FIG. 3 may have been selected by a user of display. A metrics bar 330 may be added on top of the Agile Board in FIG. 3 displaying buttons 310 which when selected or clicked-on may show metrics such as Agile Metrics, as well as a comparison to the average of the last 3/6/12 months, with links to external dashboards that provide additional information. In on embodiment, such added metrics may be those according to received user input, e.g. which the user has chosen using gear or other icon 320. For example, a plug-in may receive user input when a user clicks on button 310 such as development lead time button and in response display a metric or analysis, such as development lead time.

Embodiments may use data from source code revision tools such as the Git software tool. Embodiments may interact with Git data repositories, e.g. through a REST API provided by Bitbucket (a code management and Git hosting software by Atlassian) or other API. Version control tools such as Git software may be used by developers writing code, and may be used for collaboration within a software development team. Typically the smallest increment of work recorded by Git software is a commit, which may be the difference between the previous version and the changes which a developer is making on the source code; a commit may be considered to be or describe a change to code. Commits can be grouped together into a pull request, a collection of changes which a developer proposes to make to the "golden" source of an application's source code; a pull request may be or describe the process or approval and merging codes segments. A branch may be a folder or storage unit of a version of code which may be production code, code in development, or other code. Other groups of commits may be used; and units of work or code other than commits, branches, etc. may be used. Pull requests may also be used to provide structure to the code review process informing reviewers which changes need to be reviewed. Git commits, pull requests and code reviews may be performed on software such as the Bitbucket platform. Embodiments may use data structures extracted from software such as Bitbucket software, including commits and pull requests.

Prior art systems may consider only a limited set of data (e.g., agile data) without communicating with systems handling other data; embodiments of the present invention may improve such technology and allow combining, correlating or linking at least two or more data sets (e.g. combining or linking agile data with change management data) to for example bridge a gap between planning and delivery. Further, in prior art systems each user (e.g. team) may use each different system in a different way: embodiments of the present invention may normalize different teams' use of the different systems and the different data sets created. Embodiments of the present invention may perform inference between data sets, such as agile planning and git commits, and infer and create the links between them if team fails to create a link. Measures or recommendations created may be produced or based on such linking (e.g. when providing a recommendation that changes are auto-deployed), or on links determined which tie together more than one set of data, and thus creating KPIs may include determining a link between two or more sets of software development data.

For example, data units describing changes to software such as commits (or other software or code version change data structures) may be linked to project changes or requests such as issues (or other tasks, bug fixes, etc. to be completed on a project). Typically commits relate to code, and issues describe changes to projects which include code. A commit may be linked to the task it is completing work for; e.g., a commit may include a text description which may include an ID linking the commit to a Jira issue (e.g. the "message" field in Table 5). The ID may be for example the name of the issue. Developers may include the issue ID in the commit e.g. by inputting into a process described herein, but developers may not do this, and embodiments of the present invention may infer this information and create links between commits and issues in the case that developers do not enter the proper information. For example links to issues such as issue IDs may be in pull requests instead of commits (e.g. commits can be grouped together into a pull request), and a process may infer the issue associated with a commit from the issue ID defined in the pull request which contains the commit. An embodiment may infer links via the people associated with the various data items or sets of SDLC data: for example a commit may be assigned to an issue; and a squad which has people associated with it, may have a project or issue assigned to it. When a person indicates they are handling or have handled a commit, the commit or issue may be connected with that person, and a system may infer that the commit is handled by a squad that includes that person. In such a manner a commit may be connected with an issue by inference. Typically, a jira issue is assigned to a squad by the definition of the issue (e.g. via user input).

Table 5 depicts an example representation of a commit; other formats may be used:

TABLE 5

```
{
   "size": 1,
   "limit": 25,
   "isLastPage": true,
   "values": [
      {
         "id": "def0123abcdef4567abcdef8987abcdef6543abc",
         "displayId": "def0123abcd",
         "author": {
            "name": "charlie",
            "emailAddress": "charlie@example.com"
         },
         "authorTimestamp": 1442553509156,
         "message": "More work on feature 1 MYJIRAPROJECT-1234",
         "parents": [
            {
               "id": "abcdef0123abcdef4567abcdef8987abcdef6543",
               "displayId": "abcdef0"
            }
         ]
      }
   ],
   "start": 0,
   "authorCount": 1,
   "totalCount": 1
}
```

Table 6 depicts an example representation of a pull request; other formats may be used.

TABLE 6

```
{
   "id": 101,
      "version": 1,
      "title": "My PR",
      "description": "Making some important database changes"
   "state": "OPEN",
      "open": true,
      "closed": false,
      "createdDate": 1359075920,
      "updatedDate": 1359085920,
      "author": {
   "user": {
   "name": "tom",
         "emailAddress": "tom@example.com", "id": 115026,
         "displayName": "Tom",
            "active": true,
            "slug": "tom",
            "type": "NORMAL"
   },
         "role": "AUTHOR",
      "approved": true
      },
   ...
   }
}
```

By collecting information such as pull requests and commits from a Git repository (e.g. as part of an application 10 in FIG. 1) continually, an embodiment can determine which changes are going into each code release by combining the Git commit and pull request dataset with change management datasets. In such a manner a number of sets of SDLC or project development data, possibly from different project development systems, may be analyzed to produce an analysis (e.g. lead time). This combination enables some embodiments to compute metrics like the lead time for new features to be delivered.

Embodiments may collect data from a change management system (e.g. an application 10 in FIG. 1) which contains data about each code change that goes into production. Code being placed in production may mean that the developed code is put into use for users. Some properties used by embodiments include:

Deployment Date/Time of code;
Links from code to other entities such as Jira issues which represent the features/changes being deployed;
The current and new version of the software artefact being deployed. An artefact may be source code that results in the executable code being deployed, or a group of source code files, or another product of a project.

Combining data such as this, and/or other data, may enable embodiments to compute useful metrics. For example, lead time may be computed. Lead time may indicate the time elapsed from a given event related to code until the code is deployed into production. A basic calculation embodiments can make is the lead time from the creation of a Jira issue to when that Jira issue is deployed into production. Table 7 provides several example KPIs or metrics based on lead time.

TABLE 7

| KPI Name | Description | Start/End |
|---|---|---|
| Customer Request Lead Time | The total time customers must wait to have a feature available in Production. Also known as Order Lead Time. | From Jira issue creation To Production Release |
| Sprint Lead Time | Lead Time variant which starts the clock at the beginning of the first Sprint a story is added to. | From Beginning of first Sprint the Jira issue is added to Production Release |
| Development Lead Time | Recommended measurement of Lead Time: from the time the work on a story begins, to when that story is delivered to Production. Also known as Production Lead Time. | From Time of first "In Progress" (yellow) state in Jira To Production Release |
| Delivery Lead Time | Time from the Pull Request merge until the commits in that PR are delivered to Production. | From Pull Request Merge Time To Production Release |
| Post-Done Lead Time | Overhead from when a Jira is marked "Done" (i.e. Cycle Time) to when it is deployed to Production (i.e. Lead Time) | From Time of first "Done" state in Jira To Production Release |

Starting with a change record, an embodiment can find or determine a list of JIRA issues which are contained in the deployment represented by the commit(s). For example, commits or other software or code version change data structures may be linked to project changes or requests such as issues (or other tasks, bug fixes. etc. to be completed on a project) as described elsewhere herein. A deployment may include one or more commits or other increments of work or changes to code. An embodiment may take the creation timestamp on the relevant Jira issues and subtract it from the deployment timestamp on the change record (e.g. the timestamps in the commit(s) in the deployment). Timestamp information may come from a change management system. e.g. from a change record. In the case that a change record is not explicit (e.g. does not refer specifically to an issue using an ID), a process can infer this through the artefacts (e.g. source code) being deployed. A change record typically contains the new version being deployed, and therefore an embodiment may cross reference with Git software or repositories to find all Git commits and pull requests that were created between the time of the last deployment and the deployment of the latest version. A system may first determine which commits are being deployed in a current version, for example by determining a set of new commits from a latest version. From this set, the commits may be tied to a squad (as described elsewhere herein), and from the squad corresponding issued to link to the commits may be found.

This as a side effect, enables computing other metrics such as the size of the deployment in terms of commits and pull requests. Analysis of different SDLC or project development data may include determining links or correlations between elements (e.g. data records describing issues, commits, etc.) of the different data. For example, with this list of commits and pull requests, an embodiment may analyze the different data and check to see if there are any explicit linkages between those Git objects and any additional Jira issues as it is a common practice to link changes in source control with the requirements being implemented in Jira. After executing this process, what remains is a list of Jira issues contained in the deployment described by the change record. An example list of Jira issues and corresponding lead times is shown in Table 8; other data formats and other task descriptions may be used.

TABLE 8

| Jira ID | Jim Creation Date | Change Deployment Date | Lead Time |
|---|---|---|---|
| Jira-111 | 2021 Jan. 1 | 2021 Jan. 2 | 1 day |
| Jira-222 | 2021 Dec. 15 | 2021 Jan. 2 | 18 days |
| Jira-333 | 2021 Dec. 1 | 2021 Jan. 1 | 32 days |

Embodiments may use data from other events to calculate the lead time from different parts of the lifecycle (e.g. the lead time occurred since a PR ("pull request") merge, lead time since commit). Lead time may be an amount of time, or a time period, for example that a project takes to complete by some measure. Lead time may be an efficient KPI to indicate a team or squad's ability to service requests quickly. By using alternate means of lead time (e.g. measured according to different period boundaries or start times), an embodiment can also identify where in the process there are bottlenecks allowing teams to better improve their workflow and processes. Embodiments may measure lead time in a number of different manners, e.g. using different start times to measure different subsets of workflow. End time is deployment of a project to production. One lead time measure may start at the start of development (e.g. the lead time a customer may see); another lead time measure may start when the code creation is finished and end with deployment to measure deployment lead time. Such times may be inferred by embodiments of the present invention which may for example determine e.g. using data describing a jira issue when the jira issue is created, and which may determine, e.g. via user entered data when code is finished or deployed.

KPIs such as lead time measure predictability (e.g., how quickly a product can be delivered) metrics; however embodiments may also create and provide quality metrics. Embodiments may collect data from, for example, an incident data store such as provided by ServiceNow software, or other incident ticketing software. Data describing an incident may include for example a severity, a timestamp when it was created and a timestamp when it was closed. If the incident is deemed to be related to a production change, descriptive data may also contain a reference to the change management record that caused the problem. Incident data may be provided by itself as additional functionality or data displays to pre-existing applications, e.g. in isolation, and also in combination with other datasets such as change management data. If provided in isolation, an embodiment may calculate the mean time to recover for example based on the creation and resolution timestamps on the incident record. When combined with change management records, incident data may be used to determine the change failure rate by finding out how many change records are associated with incidents of various severities. A change failure rate KPI may measure for example a percentage of changes that resulted in degraded services, like service impairment or outage.

Created analysis of software development data may include best practice or recommendation data may, which be determined or produced based on data described herein (e.g. data sets having different formats and/or from different SDLC or project development systems) and provided by itself as additional functionality or data displays (e.g. badges, icons, links) to preexisting applications. Data sources described elsewhere herein may be used to determine productivity and quality metrics, but some embodiments may optimize these metrics and provide practices a team or squad can adopt. Best practice recommendations may be provided by determining if a project or team has followed a best practice recommendation, and in response to a user clicking on a badge or link, providing the recommendation if the best practice has not been followed. By collecting data about a software project such as CI (continuous integration) builds, an embodiment can determine which practices the teams, projects or builds are using and help them adopt other practices which may help improve their KPIs or other ratings. A CI build may have three main properties, the start time, the finish time, and the outcome. Other builds of components may be analyzed. By collecting data from software products such as CI builds, embodiments can automatically collect data, such as metadata such as artefacts of the build process, and mine these for relevant information about which tools are used for building, testing, and deploying software. For example, start time and end time of a build may be gathered from such data, may be used to determine build time, and this may produce a best practice recommendation.

In one embodiment, a best practice recommendation may tell a user if changes are auto-deployed using a scheduler. A process may take data from multiple sources, including automated deployment tooling, a deployment scheduler, and a change management system (e.g. the ServiceNow or Remedy systems of other systems). A best practice recommendation may include that production changes should be scheduled to be auto executed according to a schedule rather than triggered by a human. A process may evaluate whether or not a project has adopted this practice by looking at three data sources: change management, deployment tooling, and scheduler tooling. A process may analyze production change requests for a given project in the change management system, e.g. module 10 of FIG. 1. Each change in such a system may include a unique ID. A process may analyze deployment tooling logs, which can provide information on whether or not a production change has been deployed using the automation, and correlate the release ID (e.g., taken from change management) to automated deployments. For example, a process may take a change record, search for the deployment logs from the deployment tooling which may reference the ID of the change record, and search the logs from the scheduler tool to see if the found deployment (from searching for deployment logs)) was executed on the scheduler or not. This is relevant, as using the automated deployment tooling may be a pre-requisite for using the scheduler tooling. A process may then analyze the logs from the scheduler tooling to see if this change was executed by the scheduler by looking up this change ID from scheduler system logs. By identifying whether or not each change was deployed using the scheduler in this fashion, a process may identify the percentage of a project's changes which use this practice and assess if this best practice is generally followed or not. If a user clicks on or selects a change management link for this best practice, a best practice recommendation or report may be displayed, reporting on this percentage and/or providing a specific recommendation (e.g. production changes should be scheduled to be auto executed according to a schedule).

Embodiments may compute a build failure rate or other measures or metrics of build success or failure. Embodiments may compute an example metric using CI Build data, using the ratio of failed builds to successful builds, which may provide an indicator of the relative stability of a codebase and can be used to measure how easily a change can be made to a system. Other factors may contribute to success or ease of change, but such a ratio may be an easy to achieve high level proxy. Such metrics or measures may be presented as KPIs. Measures or recommendations (e.g. a recommendation of the software development process represented by the collected data) created may be based on links determined which tie together more than one set of data (e.g. in the context of whether or not changes are auto-deployed), and thus creating recommendations may include determining a link between two or more sets of software development data. Recommendations may be produced based on the result of such linking.

Embodiments may produce "badges" or links or displays to be displayed on or added to preexisting software, and which when clicked on may display information such as recommendations or best practices. While embodiments may calculate KPIs or metrics from the data sources discussed herein, embodiments may also use this data to assess whether or not a project has adopted best practices. Embodiments may deliver or display these metrics and best practices to the user in the vendor applications where they work on a day-to-day basis. Embodiments may determine whether or not a project follows a best practice and based on this deliver the advice to the user about best practices. Embodiments may evaluate and provide recommendations for best practices pertaining to different areas of software development; recommendations and KPIs other than those discussed herein may be produced.

Figure 4:
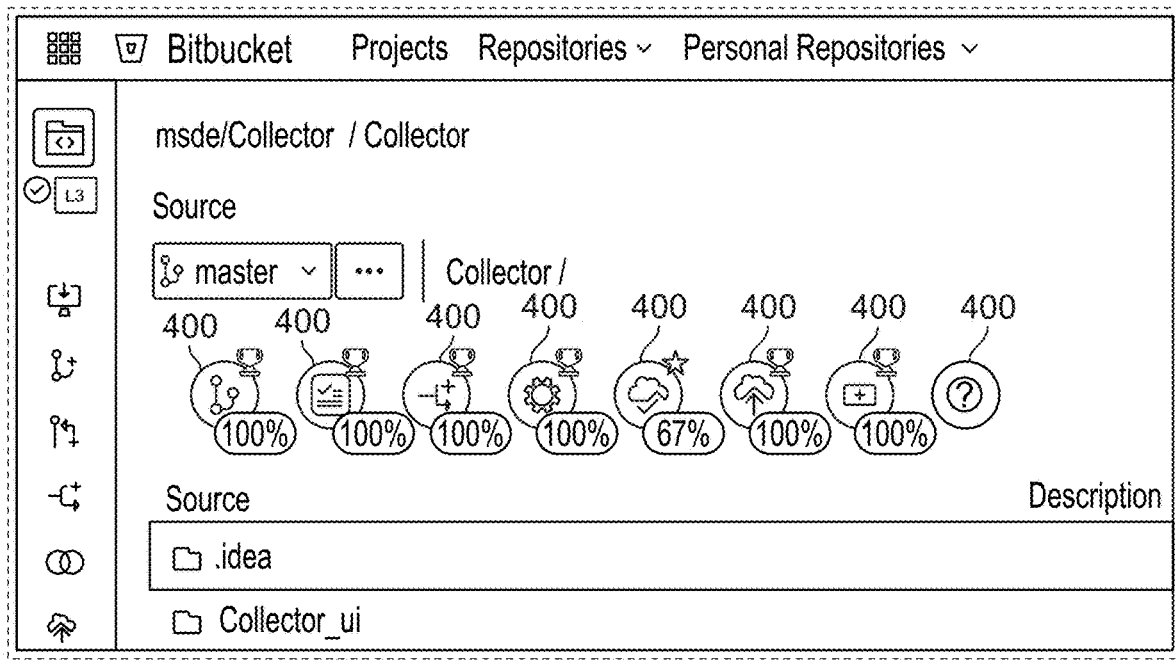
FIG. 4 depicts a display of an application displayed to a user with best practice badges, according to embodiments of the present invention.

FIG. 4 depicts a display of an application displayed to a user with best practice badges, according to embodiments of the present invention. Referring to FIG. 4, an application such as the Atlassian Bitbucket code management software (e.g. an application 20) may provide functionality allowing users to manage code being developed or maintained. Code management applications other than Bitbucket may be used. Tools used by developers such as shown in FIG. 4 may be used often, but may not have best practice capabilities which are added to the user interface, e.g. via DevOps Badges. Badges or displays 400 may be additional functionality added to preexisting software 410 (e.g. as discussed elsewhere badges may be the displayed version of a browser extension or plug-in which displays a badge or link to a user on a browser executing a preexisting application). Each separate badge 400 may represent a DevOps Capability (e.g. a category grouping together a bunch of related best practices.) A user may use code management software 410 to manage code development or change, as is known, and a user may click on a badge 400 to cause the computer displaying code management software 410 to display best practice recommendations as determined or calculated herein or cause the badge 400 to expand into a list of several best practice recommendations. Links displayed in the expansion may point to a detailed documentation page explaining what the displayed best practice means, why it is recommended to adopt this practice, what are the benefits, and how to do it with step-by-step instructions. FIG. 5 depicts a display presented to a user after clicking on an example badge (e.g. a "Pull Request Workflow" badge) according to an embodiment of the present invention.

Table 9 depicts a set of example best practice recommendations provided by embodiments of the present invention, along with example data sources; other best practices may be used.

TABLE 9

| Badge Type | Best Practice | Data Sources |
|---|---|---|
| Pull Request Workflow | Jira required on every commit | Git, JIRA |
| Pull Request Workflow | Pull Requests require all tasks to be completed before merging | Git |
| Pull Request Workflow | Pull Requests have successful build before merging | Git, Jenkins |
| Pull Request Workflow | Project uses Pull Requests | Git |
| Pull Request Workflow | Pull Requests have further evidence of review | Git |
| Pull Request Workflow | Project has a Private CI job configured in Train | Train |
| Pull Request Workflow | Pull Requests are automatically unapproved on new changes | Git |
| Pull Request Workflow | Pull Requests require at least one successful build before merging | Git, Jenkins |
| Pull Request Workflow | Project uses the Fork/Pull workflow | Git |
| Pull Request Workflow | Commits are linked to Jira stories | Git, JIRA |
| Pull Request Workflow | Pull Requests require at least one approval before merging | Git |
| Pull Request Workflow | Pull Request approved by IT Code Reviewer | Git, TAM |
| Code Quality Tooling | Project has further evidence of unit tests | Train |
| Code Quality Tooling | Test code coverage is tracked and measured | Train, SonarQube |
| Code Quality Tooling | Project uses a static code analysis tool | SonarQube, Git |
| Code Quality Tooling | EMIT automated test is successful | EMIT |
| Code Quality Tooling | Short unit test execution time | Train |
| Code Quality Tooling | Project uses SonarQube tool | SonarQube |
| Code Quality Tooling | Train CI includes periodic security scans | Train, Jenkins |

Embodiments may produce recommendation of best practices related to the pull request workflow. An embodiment may analyze the best practice of whether a project uses pull requests; such a practice suggests to developers to use pull requests as part of their development process rather than committing directly to the main branch. A pull request may be a vehicle which is recommended for modifying the main branch. Users may bypass the pull request workflow and modify the main branch directly, which is not recommended. An embodiment may use a Git pull request data set to search for pull requests targeting each project to determine whether or not that project follows this practice; if the project does not follow this practice an embodiment may provide the relevant best practice recommendation via, e.g. a badge added to an application. Branching, in version control and software configuration management, may be the duplication of an object such as source code. Each duplicated object can be modified separately and in parallel; these parallel objects are called branches. Often the branch that becomes the final product is the main branch.

Code management software such as Atlassian Bitbucket may allow recording a task list on each pull request with outstanding items that should be completed before merging a pull request (e.g. merging a branch related to the pull request to the main code). Prior art systems do not enforce practices related to this. Embodiments may suggest to developers to configure their Git repository to gate, or condition or enforce, the merging of pull requests on having a completed task list. Embodiments may use APIs to collect the Git repository configuration for each project to determine whether or not this setting is enabled; if the project does not follow enable this setting an embodiment may provide the relevant best practice recommendation via, e.g. a badge added to an application which when clicked-on produces the recommendation.

Embodiments may produce a best practice recommendation such that pull requests must have evidence of review. Pull requests can be used to bring new changes into the main branch. Embodiments may recommend that developers do not merge pull requests blindly and review them. In order to infer whether or not a pull request has been reviewed, an embodiment may analyze the Git pull request dataset to find if a pull request has any comments from other developers on them. Once each pull request is labeled as reviewed or not, an embodiment may determine whether or not this project follows this practice by evaluating whether or not the ratio of reviewed to non-reviewed pull requests on a given project meets a certain threshold; if the project does not follow this practice an embodiment may provide the relevant best practice recommendation via, e.g. a badge added to an application which when clicked-on produces the recommendation.

Embodiments may produce a best practice recommendation that a project should use the fork/pull workflow. When using Git, it is recommended that each developer uses their own fork of the application's repository and raise pull requests from their fork into the main repository rather than from other branches on the main repository into the main branch. An embodiment may determine whether or not this practice is adopted by looking at the pull request dataset, in particular the pull request source and target branches to determine whether or not this ratio of pull requests originating from forks rather than the main repository meets a minimum threshold; if it does not an embodiment may display the relevant best practice recommendation via, e.g. a badge added to an application. Pull request data may be obtained for example from a git source. Each pull request has a source branch and a target branch, and each pull request can be categorized as originating from either the main repository or from a forked repository, to detect from the source branch field. The ratio of pull requests from a fork to those which are sourced from the main repository may then be calculated.

Embodiments may produce a best practice recommendation that commits originate from pull requests. Evidence of using pull requests is not enough to know that this practice is applied consistency. Embodiments may compare commits in the main branch of a project and compare those commits with the collection of commits which have appeared in a pull request by evaluating the Git commit and pull request dataset. An embodiment may determine whether or not this practice is followed by reviewing if the percentage of these commits which have appeared in a pull request meets a minimum threshold; if it does not an embodiment may display the relevant best practice recommendation via, e.g. a badge added to an application.

Embodiments may provide best practice recommendations that pull requests are to be approved before merging. By default, a pull request can be merged without having any approvals. Embodiments may suggest to developers to explicitly mark their approval in code management software (e.g. the Bitbucket software) when reviewing pull requests. An embodiment may use the Git pull request data set to gather data about the approval actions on the pull requests of a project, then check to see if the percentage of pull requests which are merged and have explicit approvals meet a minimum threshold. If it does not the relevant best practice recommendation via may be provided, e.g. via an addition to an application.

Best practice recommendations in some embodiments may inform users that pull requests require at least one successful build before merging. Pull requests in some systems do not require evidence that the code will successfully build before they can be merged. This practice suggests to developers to configure their Git repository to gate (e.g., require or condition) the merging of pull requests on having a successful build logged in a CI system. In one embodiment, a user requesting or clicking on best practices that are being met (e.g. the users are abiding by best practices) may receive an indication that practices are being met. This may be indicated for example by color coding. For example, a best practice display may state the best practice, e.g. "Project enforces successful builds before merge". If the user(s) are abiding by the best practice, this may be displayed in green and/or have a checkmark; if the user(s) are not doing this, this may be displayed in red and/or with an X.

An embodiment may use APIs to collect the Git repository configuration for each project to determine whether or not this setting is enabled, and if it is not a best practice recommendation regarding successful builds being required may be provided, e.g. via an addition to an application.

In some embodiments best practice recommendations may inform users that pull requests require at least one approval before merging. In some systems, by default, raising pull requests does not require them to have explicit approvals. An embodiment may if conditions indicate display a best practice message suggesting to developers to configure their Git repository to gate the merging of pull requests on having an explicit approval by another developer in bitbucket. An embodiment may use APIs to collect the git repository configuration for each project to determine whether or not this setting is enabled, and if it is not, the relevant best practice recommendation may be provided. e.g. via a badge or other addition to an application.

Embodiments may produce a best practice recommendation that direct commits are restricted or pull requests (PRs) are required. Even if a team is using pull requests, it is still possible to commit directly to the main branch. An embodiment may suggest to developers to configure their Git repository to restrict the main branch from direct commits and to require that new commits can only enter the main branch through a pull request. An embodiment may use APIs to collect the Git repository configuration for each project to determine whether or not this setting is enabled, and if it is not, a best practice recommendation that commits are restricted or PRs are required may be provided. e.g. via a badge or other addition to an application.

Embodiments may display a best practice recommendation that commits be linked to JIRA stories; whether such a best practice is being met may be determined by determining a link between elements of a plurality of the plurality of sets of SDLC data, for example determining if a user has not manually linked commits to JIRA stories. It is a best practice to link commits in Git back to JIRA stories. This is helpful for maintaining traceability from implementation back to requirements. An embodiment may analyze the Git commit dataset to see if the percentage of Git commits on a project that have a linkage back to a JIRA story meets a minimum threshold. If the percentage is below a threshold, a relevant best practice recommendation may be displayed.

Embodiments may provide a best practice message that pull requests are automatically unapproved on new changes. In typical prior art systems, an approved pull request can be updated with additional changes without having the approval invalidated. Embodiments may provide a recommended practice to invalidate this approval on each change, requiring a new approval to be sure new changes are accepted. An embodiment may use APIs to collect Git repository configuration for each project to determine whether or not this setting is enabled; if not a best practice may be displayed.

Embodiments may provide a best practice message that all commits are required to be linked to JIRA stories. Even if a team has adopted the practice of linking their commits to JIRA stories, it is still possible in some systems to regress and not link a commit. A configuration option is available to gate pull requests if it contains commits without any reference to a JIRA story. An embodiment may use APIs to collect the git repository configuration for each project to determine whether or not this setting is enabled; if not a best practice may be displayed, e.g. by additional functionality provided to prior art systems.

Embodiments may use several stages in order to go from raw data to evaluating best practices, for example:

1. Collect raw data from data sources
2. Curate and clean data
3. Evaluate best practices For each project, the appropriate data may be collected that is relevant to that project (e.g. Git commits, pull requests, builds, change management etc.) in its cleaned form (e.g. after the interpolation of missing data points, regulation of the timeseries frequency, pre-calculation of metrics, etc.). Then for each time period (e.g. month) starting from a given point in time, each best practice is evaluated by pulling the relevant input data and evaluating it against a preconfigured requirement. These requirements may be for example numerical (e.g. a value is greater or less than a threshold), Boolean (project does or does not do X), or some other evaluation measure or KPI. The output of this process may be for example a table with the cross product of each project crossed or correlated with each requirement crossed with each month or time period in a timeseries, and with the evaluated value (e.g. whether or not each requirement is achieved at each point in time). For example, a process may produce the cross product: {(Proj A, Req A), (Proj A, Req B), (Proj B, Req A), (Proj B, Req B)}. An example of such an output table is shown in Table 10 below; other outputs may be provided:

TABLE 10

| Project | Requirement | Date | Achieved |
|---|---|---|---|
| Project A | Req. A | 2018 January | N |
| Project A | Req. A | 2018 February | Y |
| Project A | Req. B | 2018 January | Y |
| Project B | Req. A | 2018 January | Y |
| Project B | Req. A | 2018 February | N |
| Project B | Req. B | 2018 January | Y |

Delivery to user interfaces may be via various methods. For example, aspects of the example output of Table 10 or other information discussed herein may be inserted into preexisting applications using badges, buttons, etc.: the latest value for each requirement may be presented to users overlaid into the applications they work with on a day-to-day basis (e.g. Bitbucket software or Jira software) using a browser plugin in the Google Chrome browser. This may allow teams to always have access to the latest snapshot of their best practice adoption presented in a way which allows them to easily address their weak points.

In addition, information produced (such as in example Table 10, or other information discussed herein) may be used for historical reporting. Such data may be used to feed a visualization or data analytics tool such as a Tableau software dashboard which may summarizes the progress of teams adopting these best practices over time at an aggregate view. This may be particularly useful for an area or department leader to be able to plan to action these items in the teams they manage.

Embodiments may allow users to opt out from reporting, create custom thresholds, or otherwise configure or tailor the output provided. For example, if a team wishes to refuse a best practice and opt out from reporting their progress with a given practice, embodiments may support users' declaring this through, for example, a configuration file located in their Git repository. Before evaluating the best practices, these configuration files may be collected and processed to determine from which practices a project is opted out. Similarly, if a team deems the default threshold for a practice to be inadequate (for example, they wish to change the threshold to 30% of PRs are reviewed instead of 60%), they may also declare this through that mechanism.

Some practices may not be appropriate for all teams. For example, if a team maintains a library project that does not get deployed to a live environment, best practices about deployments are not in scope for this project. Embodiments may use automated scoping logic intelligently to evaluate the properties and dimensions of a project to know which practices are in scope and which are not. This may allow to clarify reporting to only report on relevant practices. In one example, a project may use automated deployments. If a project does not ever get deployed to a live environment (for example, a library project), the project is out of scope for this best practice and thus will not be evaluated on it. To determine whether or not it is in scope, a process may check change management software to determine if this project ever gets deployed. Given the output of this, if deployments have been found, then they are subject to this best practice, if this project has no deployments, it is out of scope for the best practice. This process may be repeated for every project to determine which best practices are in scope for which projects.

Various dashboards and displays may be produced and displayed, and be made accessible from pre-existing or prior art programs (e.g. displayed via a badge or link). For example, a squad view may display, for a selected squad, productivity (e.g. squad velocity), delivery speed (e.g. development lead time), engagement (e.g. pulse check), predictability (e.g. committed vs. completed), quality (e.g. the number of open defects), DevOps (e.g. DevOps adoption percentage).

Figure 6:
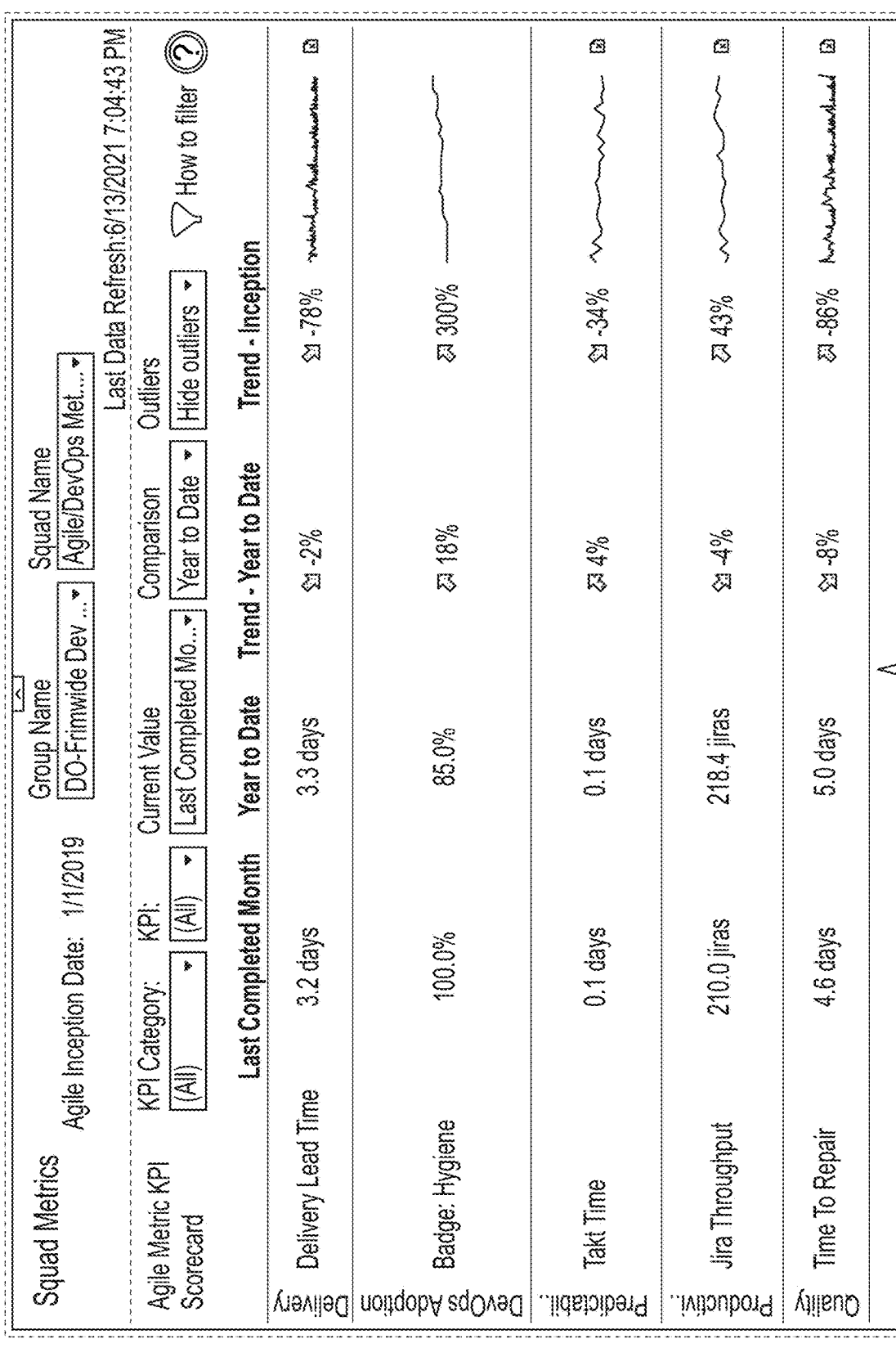
FIG. 6 depicts a set of KPIs or metrics relevant to a squad or other group of workers, according to an embodiment of the invention.
Figure 6:
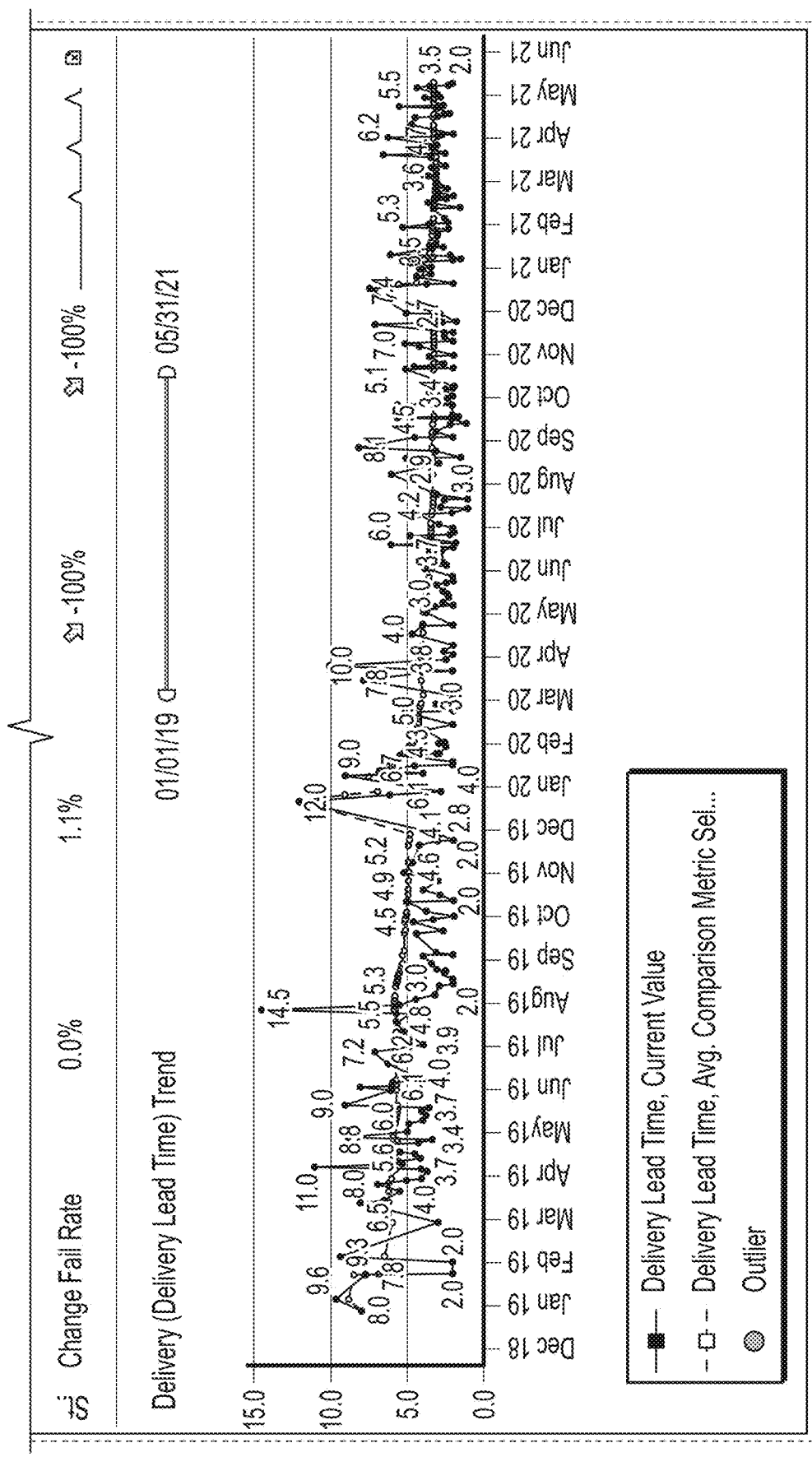

FIG. 6 depicts a set of KPIs or metrics relevant to a squad or other group of workers, according to an embodiment of the invention. The display of FIG. 6 may be provided by for example a Tableau dashboard or other functionality, and may be displayed by such a program or dashboard in response to a user clicking on a button or link added to a pre-existing application. Squad metrics or KPIs may be displayed as a list of metrics with trends over time graphed for each metric. The list of metrics may be selected or filtered. Metrics may be divided by category, e.g. Delivery (with metrics Cycle Time, Delivery Size, etc.), DevOps Adoption (with metrics Automated Deployments, Code Quality Tooling, etc.); Predictability (with metrics WIP (work in progress), WIP per person, etc.), and other categories such as Quality.

Velocity and burndown (e.g. work left to do shown against time) may be displayed, e.g. per sprint or commit, which can be displayed per team or group. Such a display may show story points not completed, and story points completed over time or completed storypoints, graphed.

Figure 7:
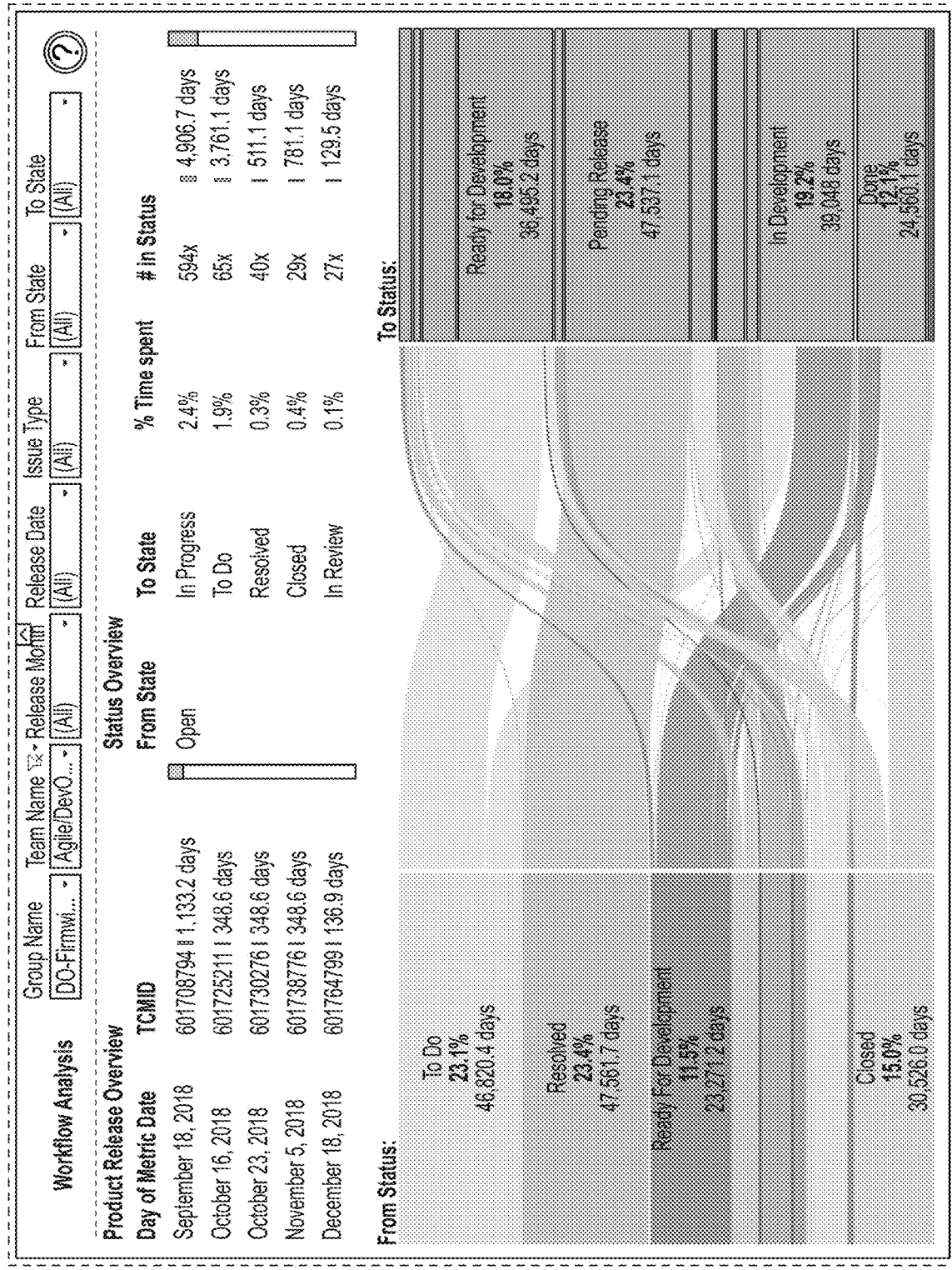
FIG. 7 depicts a workflow analysis display, according to an embodiment of the invention.

FIG. 7 depicts a workflow analysis display, according to an embodiment of the invention. The display of FIG. 7 may be provided by for example a Tableau dashboard or other functionality, and may be displayed by such a program or dashboard in response to a user clicking on a button or link added to a pre-existing application. Such a display may show workflow analysis, including for example the percentage of time spent on certain project statuses such as in progress, to-do, resolved, etc.; and the percentage of tasks that have moved between categories, e.g. the movement of projects from certain categories such as to-do, resolved, ready for development, etc., to other categories such as ready for development, pending release, etc.

Figure 8:
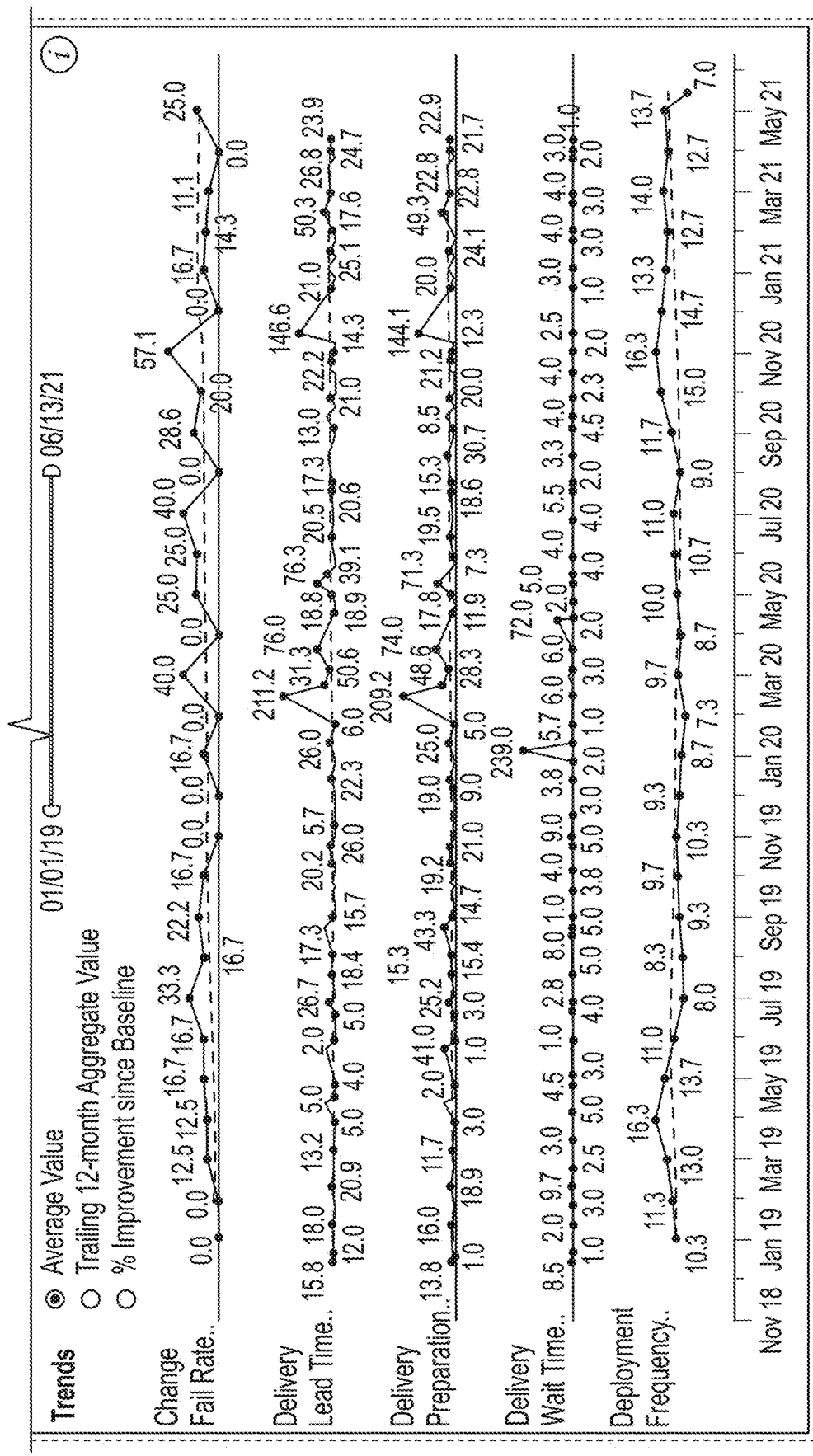
FIG. 8 depicts a management dashboard displaying aggregate ratings or KPIs, according to an embodiment of the invention.

FIG. 8 depicts a management dashboard displaying aggregate ratings or KPIs, according to an embodiment of the invention. The display of FIG. 8 may be provided by for example a Tableau dashboard or other functionality, and may be displayed by such a program or dashboard in response to a user clicking on a button or link added to a pre-existing application.

Figure 9:
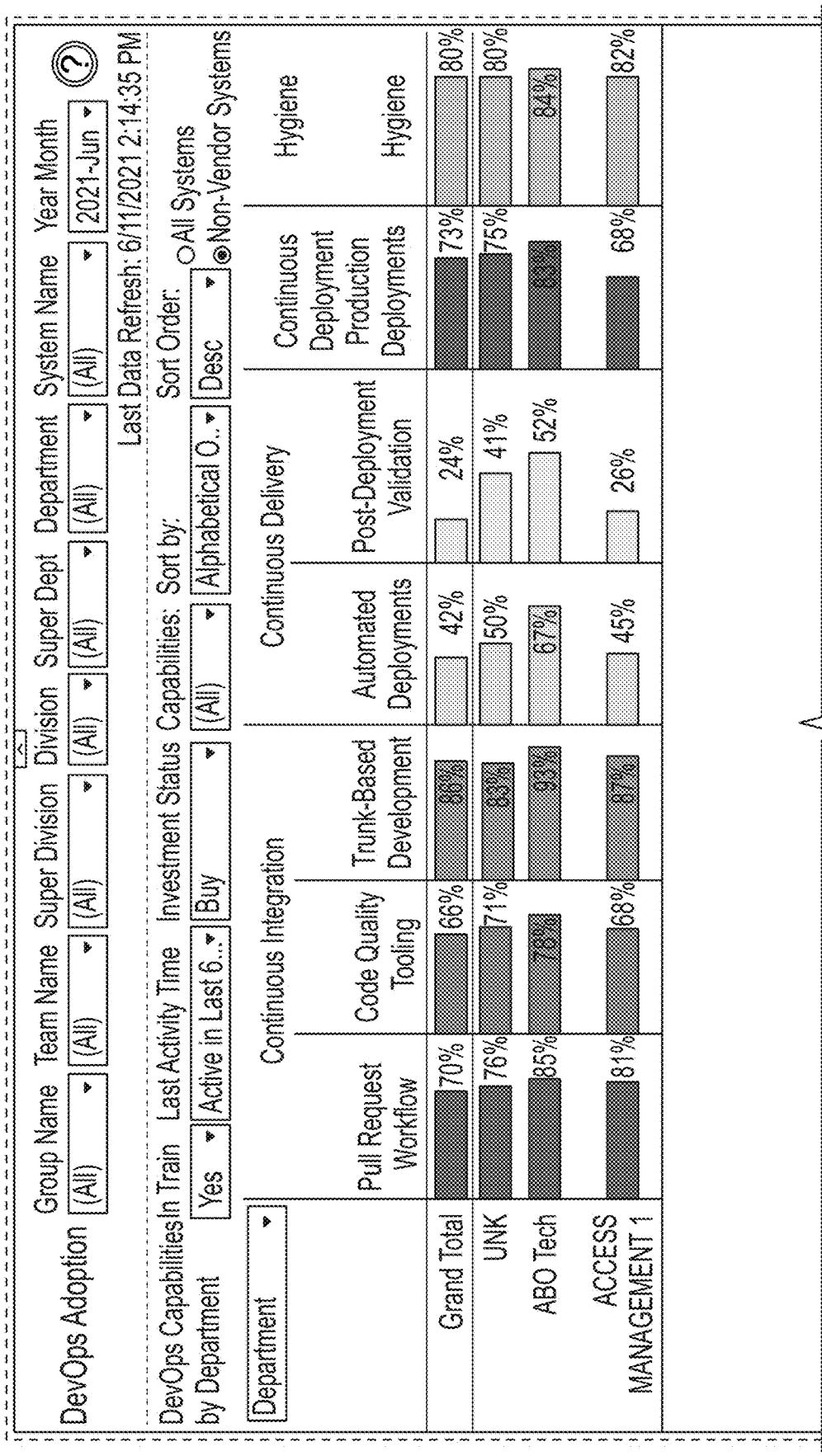
FIG. 9 depicts a management dashboard displaying development best practice adoptions, e.g. by department, according to an embodiment of the invention.
Figure 9:
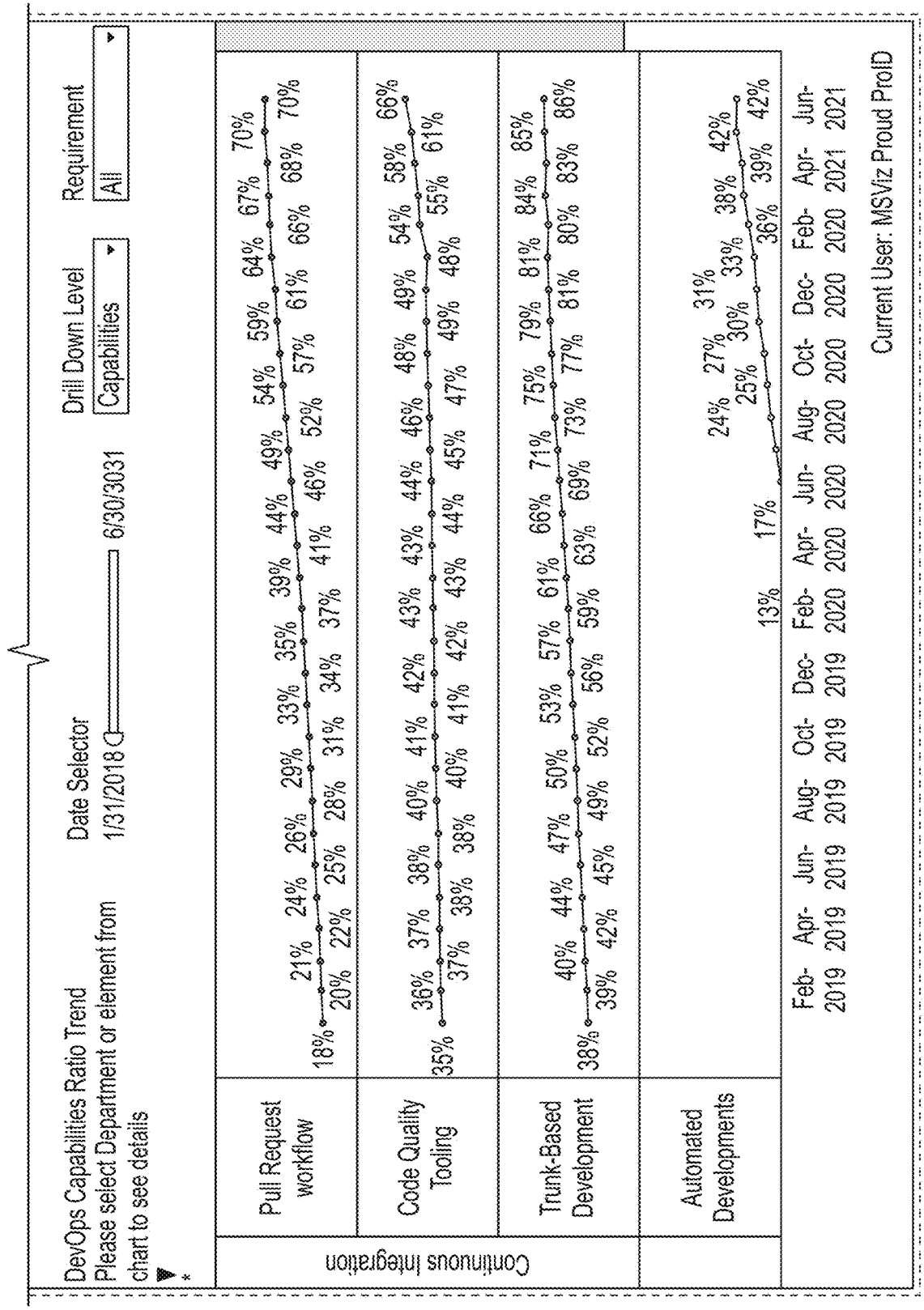

FIG. 9 depicts a management dashboard displaying development best practice adoptions, e.g. by department, according to an embodiment of the invention. The display of FIG. 9 may be provided by for example a Tableau dashboard or other functionality, and may be displayed by such a program or dashboard in response to a user clicking on a button or link added to a pre-existing application.

A display may provide metrics for groups or teams, or aggregated over all personnel or teams: e.g. sprint variability, task time, sprint velocity, Jira throughput, KPIs (e.g. delivery lead dime, development lead time, etc.), etc.; and trends such as delivery lead time over time, development lead time over time, etc. Agile adoption statistics, indicating how many users have adopted agile, may be displayed. Agile adoption may be determined by users being deemed to have adopted agile if they are in a squad assigned to a team fleet.

Figure 10:
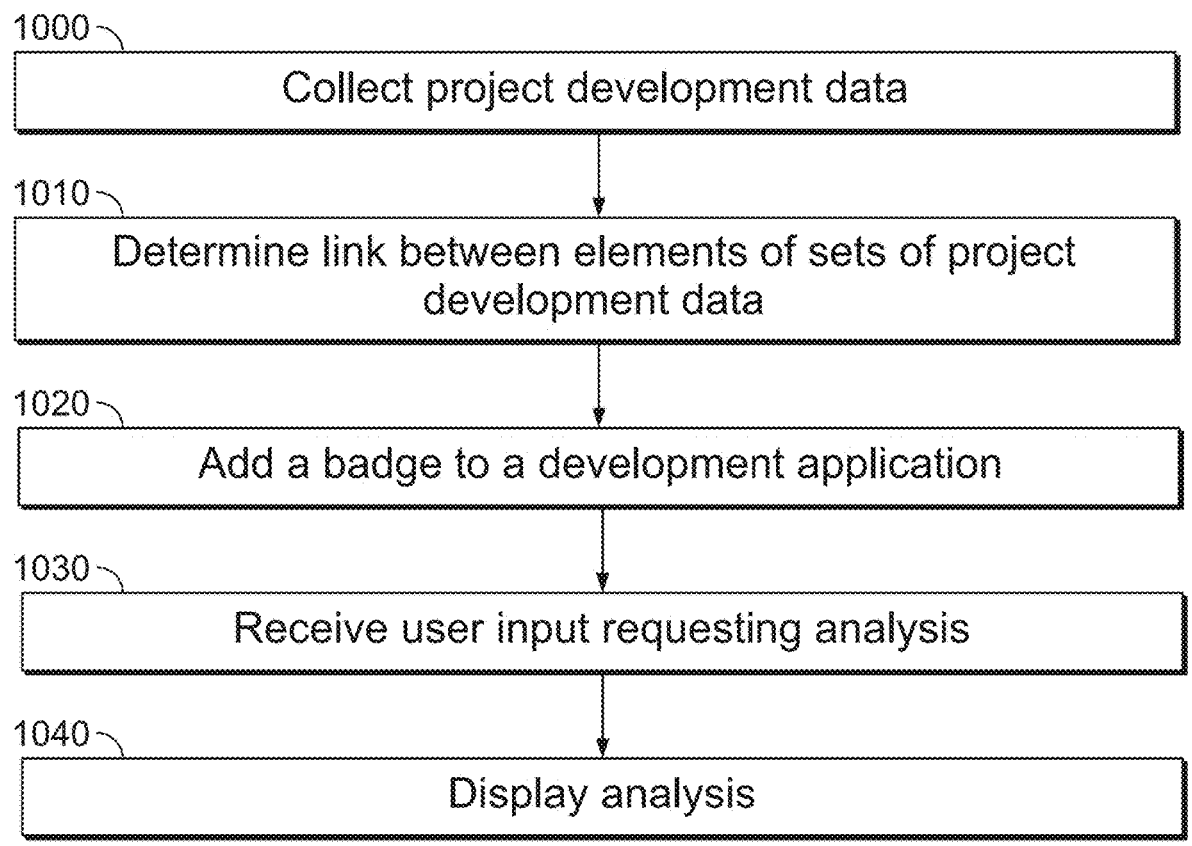
FIG. 10 shows a flowchart of a method according to embodiments of the present invention. The operations of FIG. 10 may be performed by the system shown in FIG. 1, but other systems may be used.

FIG. 10 shows a flowchart of a method according to embodiments of the present invention. The operations of FIG. 10 may be performed by the systems shown in FIGS. 1 and 11, but other systems may be used.

Referring to FIG. 10, in operation 1000, project development data such as different sets of SDLC data may be collected and recorded in different databases, e.g. database 26 of FIG. 1. Each set of data may be in a format different from the format of other of the of sets of data. For example, Git project development data may differ in format and in information content from agile project development data, and both be stored in different databases.

In operation 1010, a link between elements of a number of the plurality of sets of SDLC data may be determined, for example to tie together or correlate different specific records of different data. For example, a process may infer the issue associated with a commit from the issue ID defined in the pull request which contains the commit, or a process may infer links via the people associated with the various data items. Other methods of linking or correlating data from different data sets may be used.

In operation 1020 a badge, icon, or link may be added (or may have been previously added) to a pre-existing development application, for example via an extension or plug-in to a browser (other methods of adding such functionality to a program may be used). The added badge, icon, or link may be displayed on the preexisting program along with other, preexisting functionality.

In operation 1030 user input requesting analysis may be received; for example a user may click on (e.g. using a pointing device such as a mouse) or otherwise indicate (e.g. using a touchscreen) on an extension or plugin, or an icon displayed on an app, requesting analysis.

In operation 1040, analysis may be displayed in response to user input to an extension (e.g. one added to a preexisting SDLC or planning system). For example, a KPI or best practice may be displayed. Each specific link, plugin, etc. may if selected or clicked on lead to being displayed a specific analysis associated with that link. e.g. a link for a certain type of best practice may when clicked on may cause to be displayed that specific best practice, and a link for a certain type of KPI may when clicked on display that specific best practice. The display may be in a separate or new window, or in another manner.

Other or different operations may be used.

Figure 11:
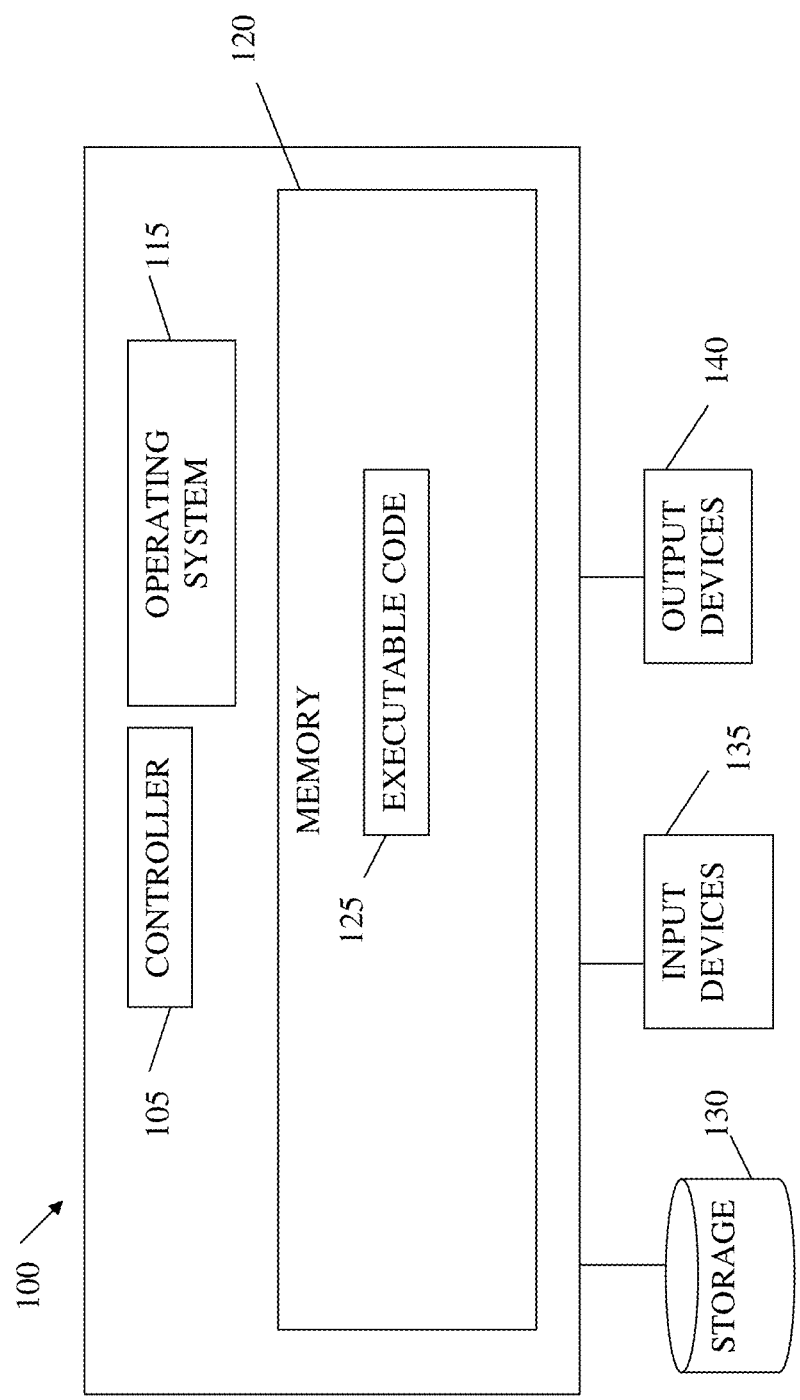
FIG. 11 shows a high-level block diagram of an exemplary computing device according to some embodiments of the present invention.

Reference is made to FIG. 11, showing a high-level block diagram of an exemplary computing device according to some embodiments of the present invention. Computing device 100 may include a controller 105 that may be, for example, a central processing unit processor (CPU) or any other suitable multi-purpose or specific processors or controllers, a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. for example when executing code 125. More than one computing device 100 may be included in, and one or more computing devices 100 may be, or act as the components of, a system according to embodiments of the invention. Various components, computers, and modules of FIG. 1 may be or include devices such as computing device 100, and one or more devices such as computing device 100 may carry out functions such as those described in FIG. 10 and produce displays as described herein.

Operating system 115 may be or may include any code segment (e.g., one similar to executable code 125) designed and/or configured to perform tasks involving coordination, scheduling, arbitration, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may configure controller 105 to link records from different data sets, form metrics or ratings, display such analysis in preexisting programs, and perform other methods as described herein. Although, for the sake of clarity, a single item of executable code 125 is shown in FIG. 11, a system according to some embodiments of the invention may include a plurality of executable code segments similar to executable code 125 that may be loaded into memory 120 or another non-transitory storage medium and cause controller 105, when executing code 125, to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. Data such as commits, issues, etc. may be stored in storage system 130 and may be loaded from storage system 130 into memory 120 where it may be processed by controller 105. Some of the components shown in FIG. 11 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a microphone, a touch screen or pad or any suitable input device. Any suitable number of input devices may be operatively connected to computing device 100 as shown by block 135. Output devices 140 may include one or more displays or monitors, speakers and/or any other suitable output devices. Any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

In some embodiments, device 100 may include or may be, for example, a personal computer, a desktop computer, a laptop computer, a workstation, a server computer, a network device, or any other suitable computing device. A system as described herein may include one or more devices such as computing device 100.

Embodiments may improve project management technology by correlating data from disparate SDLC or project development data sets, and calculating metrics or KPIs to measure the success of programs such as Agile/DevOps transformation programs (e.g. transforming from waterfall methods to agile methods), at an organization level and to individual development teams. Software or project development productivity, and delivery speed and quality of their work, may be improved, without requiring developers to navigate to external sites or applications, by adding the information to the tools developers utilize daily. New metrics, KPS, and recommendations as discussed herein may be added to preexisting and currently used programs without requiring new applications to be used, transparently and without any configuration needed. Data from various disparate SDLC technology tools (e.g. Jira, BitBucket, Jenkins, ServiceNow, etc.) and other proprietary internal tools may be aggregated together and normalized, allowing connections to be made seamlessly from these data sets. Embodiments may compute Agile and DevOps KPIs, which are then presented in a cohesive view for example at the individual Agile Squad level, but also may be aggregated up to each division within a firm, providing senior management aggregated KPIs and ability to set improvement targets at various levels of the organization.

Embodiments may improve current technology by avoiding the need to navigate to separate tools to view KPIs, metrics, best practice recommendations, etc. but rather may bring those directly to where developers will see them, significantly increasing adoption through gamification. Embodiments include the ability to join disparate data sets from all aspects of SDLC together in a meaningful way, despite these systems not being aware or compatible with each other. Prior art vendor systems are typically only compatible with other known vendors or their own stack (e.g. Atlassian), and may require extensive customization to support internally-developed tools.

Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for integrating software development lifecycle (SDLC) information, the method comprising:
    collecting a plurality of sets of SDLC data, each set in a format different from the format of others of the plurality of sets of SDLC data;
    producing, from a plurality of sets of SDLC data, an analysis of the plurality of sets of SDLC data, wherein producing the analysis comprises determining a link between elements of data having different formats, the elements taken from a plurality of the plurality of sets of SDLC data, wherein linking comprises linking change records describing a code revision to project work issue changes by searching for a set of change records created between the time of a prior code deployment and current code deployment to produce a found set of change records, and linking the found set of change records to project work issue changes by correlating a person in a squad of people assigned to change records with a squad of people handling the project work issue changes; and
    displaying the analysis in response to user input to a web browser extension added to a preexisting planning system without requiring modification to the planning system and without requiring user navigation away from the planning system.

2. The method of claim 1 wherein the sets of SDLC data are collected from a plurality of SDLC systems.

3. The method of claim 1, wherein the analysis is a KPI.

4. The method of claim 1, wherein the analysis is a best practice recommendation.

5. The method of claim 1, comprising determining a link between at least two of the plurality of sets of SDLC data using a text description, comprised in a commit, identifying a Jira issue.

6. The method of claim 1, wherein the preexisting SDLC system is a planning system.

7. A method for creating software development information, the method comprising:
    collecting a plurality of sets of software development data, each set in a format different from the format of other of the plurality of sets of software development data;
    determining a link between at least two sets of software development data, wherein determining the link comprises determining a link between elements of data having different formats, the elements taken from the plurality of sets of software development data, wherein linking comprises linking change records describing a code revision to project work issue changes by searching for a set of change records created between the time of a prior code deployment and current code deployment to produce a found set of change records, and linking the found set of change records to project work issue changes by correlating a person in a squad of people assigned to change records with a squad of people handling the project work issue changes;
    based on the link, producing, from the collected data, an analysis of software development represented by the software development data; and
    receiving, from a user, a request to display the analysis, via a display badge added to a web browser extension added to a preexisting software development system without requiring modification to the software development system and without requiring user navigation away from the software development system.

8. The method of claim 7, wherein the analysis is a KPI.

9. The method of claim 7 wherein the analysis is a best practice recommendation.

10. A system for integrating software development lifecycle (SDLC) information, the system comprising:
    a memory; and
    a processor configured to:
        collect a plurality of sets of SDLC data, each set in a format different from the format of others of the plurality of sets of SDLC data;
        produce, from a plurality of sets of SDLC data, an analysis of the plurality of sets of SDLC data, wherein producing the analysis comprises determining a link between elements of data having different formats, the elements taken from a plurality of the plurality of sets of SDLC data, wherein linking comprises linking change records describing a code revision to project work issue changes by searching for a set of change records created between the time of a prior code deployment and current code deployment to produce a found set of change records, and linking the found set of change records to project work issue changes by correlating a person in a squad of people assigned to change records with a squad of people handling the project work issue changes; and display the analysis in response to user input to a web browser extension added to a preexisting planning system without requiring modification to the planning system and without requiring user navigation away from the planning system.

11. The system of claim 10 wherein the sets of SDLC data are collected from a plurality of SDLC systems.

12. The system of claim 10, wherein the analysis is a KPI.

13. The system of claim 10, wherein the analysis is a best practice recommendation.

14. The system of claim 10 wherein the processor is configured to determine a link between at least two of the plurality of sets of SDLC data using a text description, comprised in a commit, identifying a Jira issue.

* * * * *